June 2, 1959 B. T. MARSHALL ET AL 2,889,270
FEED DISTRIBUTION SYSTEM FOR A FLUIDIZED SOLIDS VESSEL
Filed Feb. 10, 1954
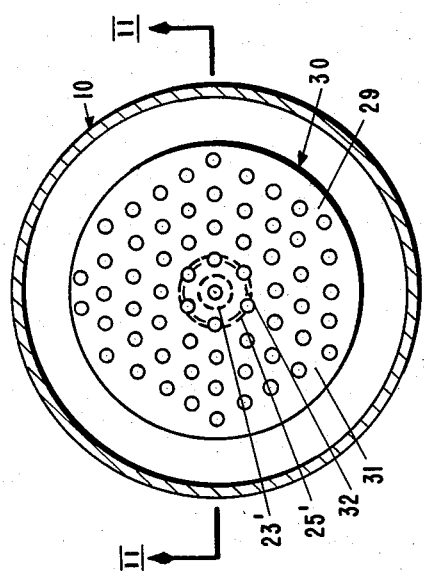
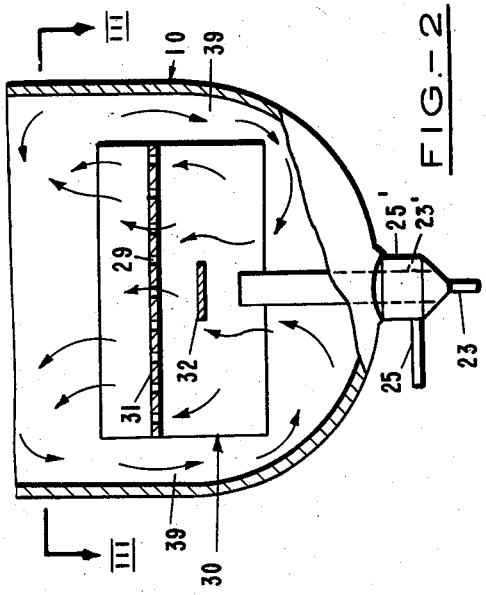
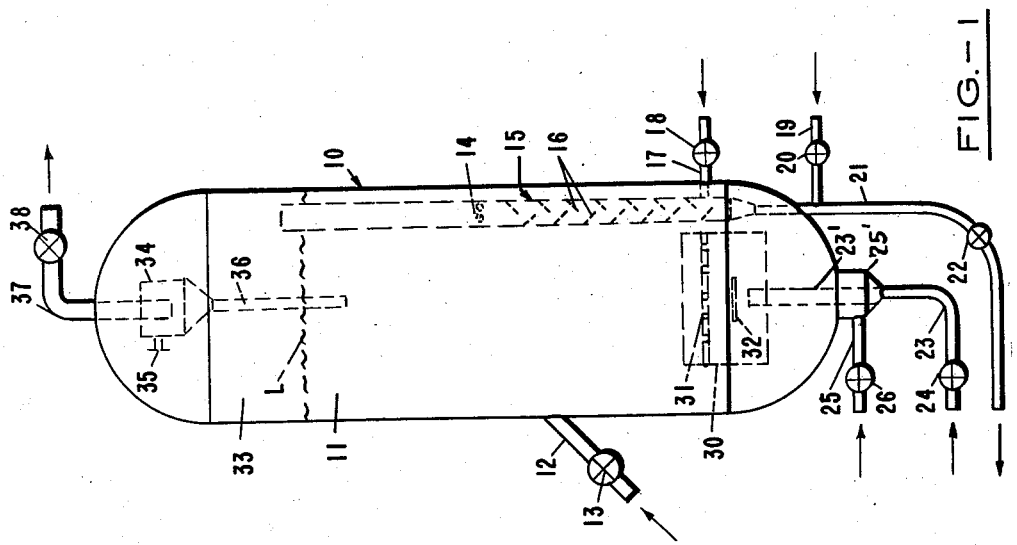
BENJAMIN T. MARSHALL
THOMAS A. REITER   INVENTORS
RICHARD J. YODER
BY George J. Silhavy   ATTORNEY

United States Patent Office 2,889,270
Patented June 2, 1959

2,889,270

FEED DISTRIBUTION SYSTEM FOR A FLUIDIZED SOLIDS VESSEL

Benjamin T. Marshall, Westfield, Thomas A. Reiter, Roselle, and Richard J. Yoder, Elizabeth, N.J., assignors to Esso Research and Engineering Company, a corporation of Delaware Application February 10, 1954, Serial No. 409,428

9 Claims. (Cl. 208—158)

This invention relates to a method and apparatus for promoting internal circulation of fluidized solids in a reaction vessel to obtain rapid quench and mixing of feed streams with the fluidized solids in addition to obtaining adequate distribution of the fluidized solids in the reaction vessel.

In any fluidized solids reaction vessel, it is essential that the fluidizing medium be adequately distributed to obtain maximum contacting efficiency. In addition to the requirement of good distribution, process considerations may place other limitations on the method and apparatus for introducing the fluidizing medium to the vessel. For example, where the fluidizing medium is a gas which is one of the heat sources of the reaction and this gas is subject to thermal degradation, it is essential that the holdup of the gas in the distribution device be minimized. Another example of a process limitation on the distribution device occurs in a process employing two different feed streams where it is essential that one of the feed streams contact the fluidized solids immediately after the other feed stream has been introduced and in addition where it is necessary that the two feed streams not be premixed. One such process is the fluid hydroforming process. Because the present invention is especially advantageous in the fluid hydroforming process, the invention will be discussed specifically with respect to this process. However, it is to be understood that the present invention may be advantageously employed with other fluidized solids systems, such as fluid coking of crude residuum, catalytic conversion of hydrocarbon gas oils, etc.

Hydroforming is a well-known process for treating hydrocarbon fractions boiling within the motor fuel or naphtha range to upgrade the same or to increase the aromaticity and improve the anti-knock characteristics of said hydrocarbon fractions. By hydroforming is ordinarily meant a hydrocarbon conversion conducted at elevated temperatures and pressures in the presence of solid catalyst particles and hydrogen whereby a hydrocarbon fraction is increased in aromaticity and in which operation there is no net consumption of hydrogen. Hydroforming operations are ordinarily carried out in the presence of hydrogen, or a hydrogen-rich recycle gas, in the pressure range of about 50–1000 lbs. per sq. in. at temperatures of about 750°–1150° F. and in contact with such catalysts as molybdenum oxide, chromium oxide, or, in general, oxides or sulfides of metals of groups IV—VIII of the periodical system of elements, alone, or generally supported upon a base or spacing agent such as alumina gel, precipitated alumina, or zinc aluminate spinel.

The hydroforming process has been conducted with a fixed bed of catalyst in certain installations. However, it has been found to be particularly advantageous to employ a fluidized bed of catalyst for the hydroforming process since the fluidized bed has several fundamental advantages over the fixed bed hydroforming process. In the fluidized solids hydroforming system, naphtha vapors are passed continuously through a dense fluidized bed of hydroforming catalyst particles in a reaction zone, and spent catalyst particles are withdrawn from the dense bed in the reaction zone and passed to a separate regeneration zone wherein activating carbonaceous deposits are removed by combustion. The regenerated catalyst particles are returned to the main reactor vessel or hydroforming reaction zone. The following advantages are realized in the fluid hydroforming process as compared to the fixed bed type of hydroforming process: (1) the operations are continuous; (2) the reactor temperature is substantially constant throughout the reactor dense bed; (3) the vessels can be designed for single rather than dual functions; (4) the regeneration of the catalyst may be readily controlled, and (5) the hot regenerated catalyst can be utilized to supply at least a part of the heat of reaction to the reaction or hydroforming zone.

A number of problems have been encountered, however, in the fluid hydroforming process. One of these is the problem of obtaining good distribution of the catalyst particles in the fluidizing medium, which, in this particular process, comprises the hydrogen-rich recycle gas and the naphtha vapor. In general, the fluid hydroforming process is carried out at superficial gas velocities of about 0.4 to about 1.2 ft. per second. However, at these relatively low superficial gas velocities it is difficult to obtain good distribution, but because the entrainment of catalyst from the reactor bed increases rather rapidly as the superficial gas velocity is increased above about 1.2 ft. per second, it has been found necessary to maintain the superficial gas velocity below about 1.2 ft. per second. It is, therefore, especially important in the fluid hydroforming process that the feed distribution system provide a means for effecting good distribution of the catalyst particles and gas streams in the zone of mixing.

Another problem associated with fluid hydroforming is the heat requirement necessary for conducting the hydroforming reaction. In general, the hydroforming reaction is conducted at temperatures between about 850 and 950° F. Because the hydroforming process is endothermic, it is therefore necessary to introduce the catalyst and feed streams such that the average initial temperature of the combination will be higher than the average temperature of about 850–950° F. in the reaction zone. The naphtha feed stock is ordinarily preheated to about 800–1050° F., preferably about 950° F., before charging it to the reactor. Thermal degradation of the naphtha feed stock at these preheated temperatures will result if the time of residence thereof in the feed inlet lines is appreciable. It is, therefore, desirable to employ a feed distribution system which will effect a minimum hold-up time of the naphtha feed stock. The hydrogen-rich recycle gas is ordinarily preheated to temperatures of about 1050–1200° F. Since the recycle gas may contain appreciable amounts of low-boiling hydrocarbons, it is also desirable to minimize the hold-up time involved in distributing this feed stream to the reaction zone to avoid thermal degradation of its hydrocarbon constituents.

The regenerated catalyst is normally introduced to the hydroforming reaction zone at a temperature of about 1100–1200° F. It is desirable to quench this catalyst and the gaseous feed streams to the reaction temperature rapidly to avoid thermal degradation of the hydrocarbons in the recycle gas stream and the naphtha feed stock. It is, therefore, a further requirement of the feed distribution system that the catalyst particles and gaseous feed streams be rapidly and thoroughly mixed.

Another limitation in the hydroforming process is that the naphtha feed stock and recycle gas may not be premixed because the high temperature recycle gas, if mixed with the naphtha feed stock, would cause excessive thermal degradation of the naphtha feed stock. To prevent this thermal degradation, it is, therefore, necessary to initially contact the catalyst particles in the fluid bed which are at the average reaction temperature of about 850–950° F. with the high temperature recycle gas to quench the recycle gas and immediately thereafter to contact the mixture with the naphtha feed stock to thereby heat the naphtha feed stock.

Also it is essential in the hydroforming process to minimize the losses of catalyst from the system. The feed distribution device employed must, therefore, cause a minimum of attrition of the catalyst to non-recoverable fines. Thus any device involving high velocity jets of gas and/or gas-solids mixtures should be avoided because such devices cause excessive catalyst attrition.

A number of feed distribution systems have been employed in fluid hydroforming processes. Among these are the grid type distributor, multiple nozzle distributor with external headers, single injection nozzle with baffle mounted above, and the multiple nozzle distributor with internal header. These prior distribution systems have certain disadvantages, each of them having one or more of the following disadvantages:

(1) Long hold-up time on feed streams resulting in excessive thermal degredation.

(2) High pressure drop.

(3) Excessive catalyst attrition.

(4) Improper sequence of mixing feed streams and catalyst.

(5) Nozzle plugging, and (6) Poor distribution and mixing of the catalyst and feed streams. The present invention is designed to overcome these difficulties encountered with the prior distribution systems.

It is an object of this invention to provide a novel method and apparatus for promoting internal circulation in fluidized solids vessels to obtain rapid quench and mixing of feed streams with fluidized solids while at the same time obtaining adequate distribution.

It is also an object of this invention to provide a novel method and means for introducing feed streams into a fluidized solids vessel with minimum hold-up time on the feed streams and with a minimum pressure drop in distributing the feed streams.

Other objects of this invention will be apparent from a reading of the specification, which will be best understood by reference to the drawings in which:

Fig. 1 is a diagrammatic cross-sectional view of a fluidized solids reactor including a feed distribution system made in accordance with the present invention;

Fig. 2 is an enlarged vertical cross-sectional view of the feed distribution system of the present invention taken along line II—II illustrating the path of circulation of the fluidized solids; and Fig. 3 is a horizontal cross-sectional view of the fluidized solids reactor taken along the line III—III of Fig. 2 showing further detail of the feed distribution system of the present invention.

Referring now to Fig. 1, reference character 10 designates a vertically arranged cylindrical reaction vessel in which dense bed 11 of fluidized catalyst or solid particles is maintained at level L. Although the feed distribution device of the present invention is applicable to any fluidized solids system, it will be described specifically in regard to the fluid hydroforming process. In the case of hydroforming, suitable catalysts which may be employed include platinum or palladium upon a support such as alumina, or a group VI metal oxide such as molybdenum oxide, chromium oxide, tungsten oxide, or vanadium oxide or mixtures thereof, preferably dispersed upon a support or spacing agent such as activated alumina, alumina gel, zinc aluminate spinel or the like. Preferred catalysts contain about 0.2 to 2.0 wt. percent platinum upon alcoholate alumina or about 5 to 15 wt. molybdenum oxide or from about 10 to 40 wt. percent chromium oxide upon a suitable carrier. If desired, minor amounts of stabilizers and promoters such as silica, calcium oxide, ceria, or potassia can be included in the catalyst. The catalyst particles are for the most part between about 200 and 400 mesh in size or about 0 to 200 microns in diameter with a major proportion between 20 and 80 microns. During the hydroforming process, the catalyst particles became relatively inactivated due to the deposition of carbonaceous deposits on the outer surface of the catalyst particles. These carbonaceous deposits are removed in a regenerator (not shown) and the regenerated catalyst particles are reintroduced to dense bed 11 through inlet line 12. The rate of introduction of these regenerated catalyst particles may be regulated by valve 13 in line 12.

Inactivated or spent catalyst particles are removed from dense bed 11 through inlets 14 of stripper 15 which is a long tube arranged vertically in the interior of reactor 10 and spaced near the wall of reactor 10. The top of stripper 15 extends above level L of dense bed 11. A series of baffles 16 are preferably arranged within stripper 15 between inlets 14 and the bottom of the stripper 15. Stripping gas, such as steam, is introduced to the lower end of stripper 15 by means of line 17, and the rate of introduction of the stripping steam is controlled by valve 18 in line 17. The spent catalyst particles thus enter the interior of stripper 15 through inlets 14 and fall downwards, due to the force of gravity, past baffles 16, and in doing so, are stripped of entrained hydrocarbons by the stripping gas introduced at the bottom of stripper 15. The stripped spent catalyst passes from the bottom of stripper 15 into line 21 through which the catalyst particles pass to the regenerator. A fluidizing gas such as steam, nitrogen, etc. is introduced into line 21 by means of line 19 to maintain the catalyst particles in line 21 in a fluidized condition. The rate of introduction of fluidizing gas into line 21 through line 19 is controlled by means of valve 20 in line 19. The rate of catalyst withdrawal from vessel 10 may be controlled by valve 22 in line 21. Regeneration of spent catalyst is effected at substantially the same pressures as is maintained in reactor 10 and at temperatures of about 1100–1200° F. The average residence time of the catalyst in reactor 10 is from about 0.5 to 5 hours, while the average residence time of the catalyst in the regenerator is from about five minutes to an hour or more.

Naphtha feed stock is introduced into the bottom portion of reactor 10 and dense bed 11 through inlet line 23, which is enlarged in its terminal section 23' to partially decelerate the entering naphtha vapor to thereby prevent excessive catalyst attrition. The rate of introduction of naphtha through line 23 is controlled by means of valve 24 in line 23. Enlarged section 23' extends upwards substantially vertically through the bottom of reactor 10 and is arranged centrally with respect to reactor 10. The outlet end of section 23' is spaced above the bottom of reactor 10 and is arranged centrally with respect to reactor 10. The outlet end of section 23' is spaced above the bottom of reactor 10. The feed or charge stock to the hydroforming reactor may be a virgin naphtha, a cracked naphtha, a Fischer-Tropsch naphtha, or the like having a boiling range of about 125 to 450° F. or it may be a narrow boiling cut within this range. The feed stock is ordinarily preheated to about 800–1050° F. and preferably about 950° F. before charging to the reactor.

The hydrogen-rich recycle gas is introduced into the bottom of dense bed 11 in reactor 10 through inlet line 25 which has an enlarged terminal portion designated as section 25'. Enlarged section 25' of inlet 25 is larger than and is arranged concentrically around enlarged section 23'. Inlet line 25 is enlarged in section 25' so as to reduce the velocity of the recycle gas stream in order to prevent excessive catalyst attrition. The outlet end of section 25 opens into the bottom of reactor 10 and is substantially flush with the reactor bottom so that the outlet end of section 25' is at a lower level than the outlet of inner pipe section 23'. The hydrogen-rich recycle gas enters the bottom of dense bed 11 through the annular space or passage formed between section 23' and section 25' and the mixture of catalyst particles and recycle gas flows upward in the central portion of reactor 10. The mixture of catalyst and recycle gas thus flows up past section 23' of inlet line 23 so that as a result the recycle gas contacts the catalyst particles prior to the introduction of the naphtha feed stock into dense bed 11 through section 23'. The recycle gas contains about 50–80 vol. percent hydrogen and is preheated to temperatures of about 1050–1200° F. It is supplied to the reaction zone at a rate of about 1000–8000 cu. ft. per barrel of naphtha feed. The weight ratio of catalyst to oil introduced into reactor 10 will be normally about 0.5 to 5.0. It is normally preferred to operate at a catalyst to oil ratio of about 1.0 since higher ratios tend to give excessive carbon formation.

In accordance with the present invention, a hollow cylindrical member or draft tube 30 is arranged in the bottom portion of reactor 10. Draft tube 30 is positioned concentrically with respect to the vertical axis of reactor 10 and is open at its upper and lower ends. The diameter of draft tube 30 will be about 0.4 to 0.9 of the diameter of reactor 10, and the height of draft tube 30 will be about 0.1 to 0.4 of the height of dense bed 11 in reactor 10 or, expressed in another way, less than about ⅓ of the height of reactor 10. Perforated circular grid 31 is arranged transversely within draft tube 30 and is positioned in the upper portion of draft tube 30. Although grid 31 is indicated to be a flat horizontally arranged member in Figs. 1 and 2, it is to be understood that grid 31 may be constructed to be slightly concave upwardly for reasons of mechanical design to provide greater strength per unit thickness of grid 31. The diameter of perforated grid 31 is equal to the internal diameter of draft tube 30. Baffle 32, which is preferably circular, is spaced within draft tube 30 and is located below grid 31 but above section 23'. The outlet end of section 23' of inlet line 23 is extended up into the lower portion of draft tube 30 so that in start-up, the circulation of catalyst may be initiated in the proper direction, which is generally upwards within draft tube 30. Baffle 32 is arranged centrally of draft tube 30 and directly above the outlet end of section 23' to prevent erosion damage from the direct impingement of the catalyst and naphtha and recycle gas streams on grid 31. The diameter of baffle 32 is preferably about the same as the diameter of section 25'.

Referring now to Fig. 2, the general circulation pattern of the catalyst particles in the bottom portion of reactor 10 is indicated by the arrows shown in the drawing. It will be noted that the flow of catalyst particles and gases within draft tube 30 is upwards with the catalyst and gases flowing up through openings 29 in perforated grid 31. Within draft tube 30 is a region of relatively high velocity which results in a relatively low solids density. It will also be noted that a dense mass of catalyst flows downwards at a higher density than in draft tube 30, as in a standpipe, through the annular zone 39 between reactor 10 and draft tube 30 as indicated by the arrows in the drawing. The catalyst particles flowing downwards through annular zone 39 initially contact recycle gas introduced to the bottom of reactor 10 through section 25' of inlet line 25. The mixture of catalyst particles and the recycle gas then flows upwards into the bottom opening of draft tube 30 and contacts the naphtha vapors introduced through section 23' of inlet line 23 into the lower portion of draft tube 30. In the design of the apparatus of this invention for the hydroforming process, the diameter and the height of draft tube 30 are preferably selected so that while still assuring distribution over a sufficient area at the bottom of reactor 10 through draft tube 30 (namely, 0.4–0.9 of the diameter of reactor 10), a driving force through draft tube 30 of about 10" of water is obtained. This driving force is equivalent to the difference in density of the downflowing catalyst in annular zone 39 and the density of the upflowing catalyst in the interior of draft tube 30 times the height of draft tube 30. In the case of a hydroforming reactor, such a driving force will provide a sufficient catalyst circulation rate through draft tube 30 to adequately quench the gas streams to a temperature within about 30° F. of the average reactor temperature.

Grid 31 is shown in detail in Fig. 3. It will be noted that grid 31 is perforated and contains a multiplicity of openings 29 for passage of the catalyst and gaseous streams. The purpose of grid 31 is to distribute the mixture of catalyst and gases uniformly into the upper portion of dense bed 11. Grid 31 has about 20–50% open area so as to provide a pressure drop of about 1–10" of water when a gas-solids mixture, containing sufficient solids to adequately quench the gas, flows through the grid. With such a low pressure drop, high velocity jets are avoided and catalyst attrition is minimized.

The circulation and mixing indicated in Fig. 2 provides an efficient distribution of the recycle gas and naphtha into dense bed 11 of the catalyst particles. In addition, there is a minimum hold-up of the recycle gas and the naphtha in the distribution system so that thermal degradation of these two streams is held to a minimum. Also, it will be noted that the streams are mixed in the proper sequence with the recycle gas initially contacting the catalyst particles and immediately thereafter the catalyst-recycle gas mixture contacting the naphtha vapors. It will be further noted that thorough and rapid mixing and quenching are accomplished without premixing of the naphtha vapors and the recycle gas.

The gaseous products passing through the upper opening of draft tube 30 continue to rise through dense bed 11 and pass into dilute phase zone 33 in the upper portion of reactor 10. In passing from dense bed 11, a certain amount of catalyst particles are entrained with the gaseous products into dilute phase zone 33. These entrained catalyst particles are separated from the gaseous products in cyclone separator 34. The gaseous products and entrained catalyst particles enter separator 34 through opening 35, and the separated catalyst particles are returned to dense bed 11 through line 36 of cyclone separator 34, and the gaseous products leave the upper portion of cyclone separator 34 and pass out of reactor 10 through outlet line 37 having valve 38. In certain instances, two or more cyclone separators may be used in series to effect the separation of entrained catalyst particles from the gaseous products produced in reactor 10. The product vapors leaving reactor 10 through line 37 are passed to recovery equipment wherein the various hydrocarbon products are recovered and separated.

It is to be understood that the present invention is not limited to fluid hydroforming but may be advantageously employed with other fluidized solids processes. For example in fluid coking wherein a fluid bed of finely divided coke particles is employed, steam may be introduced to the fluid bed of coke particles through section 25' and a crude residuum may be introduced through section 23' into draft tube 30 to thereby effect a thorough and rapid mixing of these feed streams with the coke particles. Also, for example, in a fluid catalytic cracking process, steam may be introduced into the bottom of a bed of fluidized catalyst, such as silicia-alumina, through section 25' and a hydrocarbon gas oil may be introduced to the bed of fluidized catalyst through section 23' with the resultant mixture flowing upwards through draft tube 30 to thereby effect a thorough and rapid mixing of the feed streams and catalyst.

What is claimed is:

1. Apparatus adapted for distributing two feed streams into a dense bed of fluidized solids, which comprises a vertically arranged cylindrical vessel adapted to contain a dense bed of fluidized solids, a hollow cylindrical draft tube spaced centrally and aligned vertically within the bottom portion only of said vessel, a first inlet conduit for introducing a first feed stream into said dense bed, said first inlet conduit being arranged centrally of and extending through the bottom of said vessel into the bottom portion of said draft tube, a second inlet conduit for introducing a second feed stream into the bottom of said dense bed, said second inlet conduit being arranged concentrically about said first inlet conduit and communicating with the bottom of said vessel, the outlet end of said second conduit being substantially flush with the vessel bottom and a perforated grid arranged transversely within the upper portion of said draft tube and positioned a distance above the outlet of said first inlet conduit.

2. The apparatus of claim 1 in which the diameter of said draft tube is about 0.4–0.9 of the internal diameter of said vessel.

3. The apparatus of claim 1 in which the height of said draft tube is less than about ⅓ of the height of said vessel.

4. The apparatus of claim 1 in which a baffle is arranged horizontally between said first inlet conduit and said perforated grid to prevent erosion of said perforated grid by said upwardly moving feed streams.

5. A method for introducing two feed streams into a cylindrical contacting zone containing a dense bed of fluidized solids which comprises introducing a first feed stream into the bottom of said contacting zone, introducing a second separate feed stream into said contacting zone at a point above the bottom of said contacting zone, passing the resultant mixture of fluidized solids and combined feed streams upward through a restricted zone in the lower portion of said contacting zone to subdivide the resultant mixture into a multiplicity of streams and to distribute said resultant mixture uniformly within the upper portion of said restricted zone, said restricted zone having a smaller diameter than said contacting zone, passing said resultant mixture upward from said restricted zone into a zone of relatively low superficial velocity to partially settle out a portion of said fluidized solids from said mixture, and flowing said settled out fluidized solids downward within said contacting zone and around said smaller restricted zone to the bottom of said contacting zone in unobstructed flow as a dense fluidized mass of solids having a higher density than the mixture in said restricted zone.

6. Apparatus for contacting solids and gasiform fluids which includes a vertically arranged cylindrical vessel adapted to contain a dense bed of fluidized solids, a hollow cylinder arranged in the bottom portion of said vessel for effecting contact between solids and gasiform fluid, said hollow cylinder being concentric with the vertical axis of said vessel and of a smaller diameter to form an unobstructed annular space between said cylinder and the inner wall of said vessel for the downward flow of fluidized solids, a first fluid inlet line extending upwardly through the bottom of said vessel into the bottom portion of said cylinder, a second fluid inlet line arranged concentrically with said first fluid inlet line and communicating with the bottom portion only of said vessel whereby gasiform fluid introduced through said second inlet mixes with the downflowing fluidized solids before said solids contact fluid from said first inlet, said second fluid inlet line having a larger diameter than said first fluid inlet line so as to be spaced from said first fluid inlet line, said second fluid inlet line having its outlet end substantially flush with the bottom of said vessel, and a perforated distribution grid of substantially the same diameter as said cylinder and arranged horizontally in the upper portion of said cylinder, said grid being positioned above and spaced from the outlet end of said first fluid inlet line.

7. A method for contacting finely divided solids and gasiform fluids which comprises forming a dense fluidized bed of solids in a vertical cylindrical contacting zone, introducing a first gasiform fluid into the bottom portion only of said contacting zone and said fluidized bed of solids for admixture with the finely divided solids, introducing a second gasiform fluid into the contacting zone at a level higher than the introduction of said first gasiform fluid for admixture with the solids and the first gasiform fluid, passing the resulting mixture through a restricted zone of smaller diameter than and arranged concentrically in the bottom portion of said contacting zone, subdividing said last-named mixture in said restricted zone into a multiplicity of small streams and then combining the multiplicity of streams into one stream, passing said last-mentioned stream upwardly from said restricted zone into a zone where the superficial velocity of the gasiform fluid is reduced to cause partial settling out of a portion of the solids from the last-mentioned single stream, returning the settled out solids downward within said contacting zone and around said restricted zone to the bottom of said contacting zone as a down-flowing dense fluidized mass of solids having a higher density than the mixture in said restricted zone for recirculation through said restricted zone and passing the rest of the solids upwardly into the dense fluidized bed of solids.

8. A method according to claim 7 wherein said contacting zone is a hydroforming zone, the solids are hydroforming catalyst particles, said first gasiform fluid comprises hot recycle hydrogen-containing gas for initial admixture with catalyst particles and said second gasiform fluid comprises naphtha vapors for admixture with the previously formed mixture of recycle gas and catalyst particles.

9. A method for distributing two gasiform fluids into a contacting zone containing a dense bed of fluidized solids which comprises introducing a first gasiform fluid into the bottom only of said contacting zone for admixture with said fluidized solids, passing the mixture upward into the bottom of a restricted passage within said contacting zone, introducing a second gasiform fluid into the bottom of said restricted passage for admixture with said previously formed mixture of said fluidized solids and said first gasiform fluid, passing the resultant mixture upward in said restricted passage, subdividing said last-mentioned mixture into a plurality of small streams, recombining the plurality of small streams into a single stream, passing said stream upwards out of said restricted passage into said contacting zone wherein the superficial velocity of said stream is reduced, settling out a portion of said fluidized solids, and flowing the settled out fluidized solids as a downward moving dense fluidized mass within said contacting zone and around and exterior to said restricted passage for admixture with said first gasiform fluid in the bottom of said contacting zone.

References Cited in the file of this patent

UNITED STATES PATENTS

| | | |
|---|---|---|
| 2,444,289 | Gorin et al. | June 29, 1948 |
| 2,472,844 | Munday et al. | June 14, 1949 |
| 2,560,356 | Liedholm | July 10, 1951 |
| 2,582,710 | Martin | Jan. 15, 1952 |
| 2,597,346 | Leffer | May 20, 1952 |
| 2,608,474 | Gilliam | Aug. 26, 1952 |
| 2,690,962 | Clark | Oct. 5, 1954 |
| 2,701,230 | Blanding | Feb. 1, 1955 |
| 2,709,675 | Phinney | May 31, 1955 |
| 2,717,860 | Rex | Sept. 13, 1955 |